March 7, 1950      G. W. BRADY      2,499,813
CONTROL SYSTEM
Filed July 7, 1944
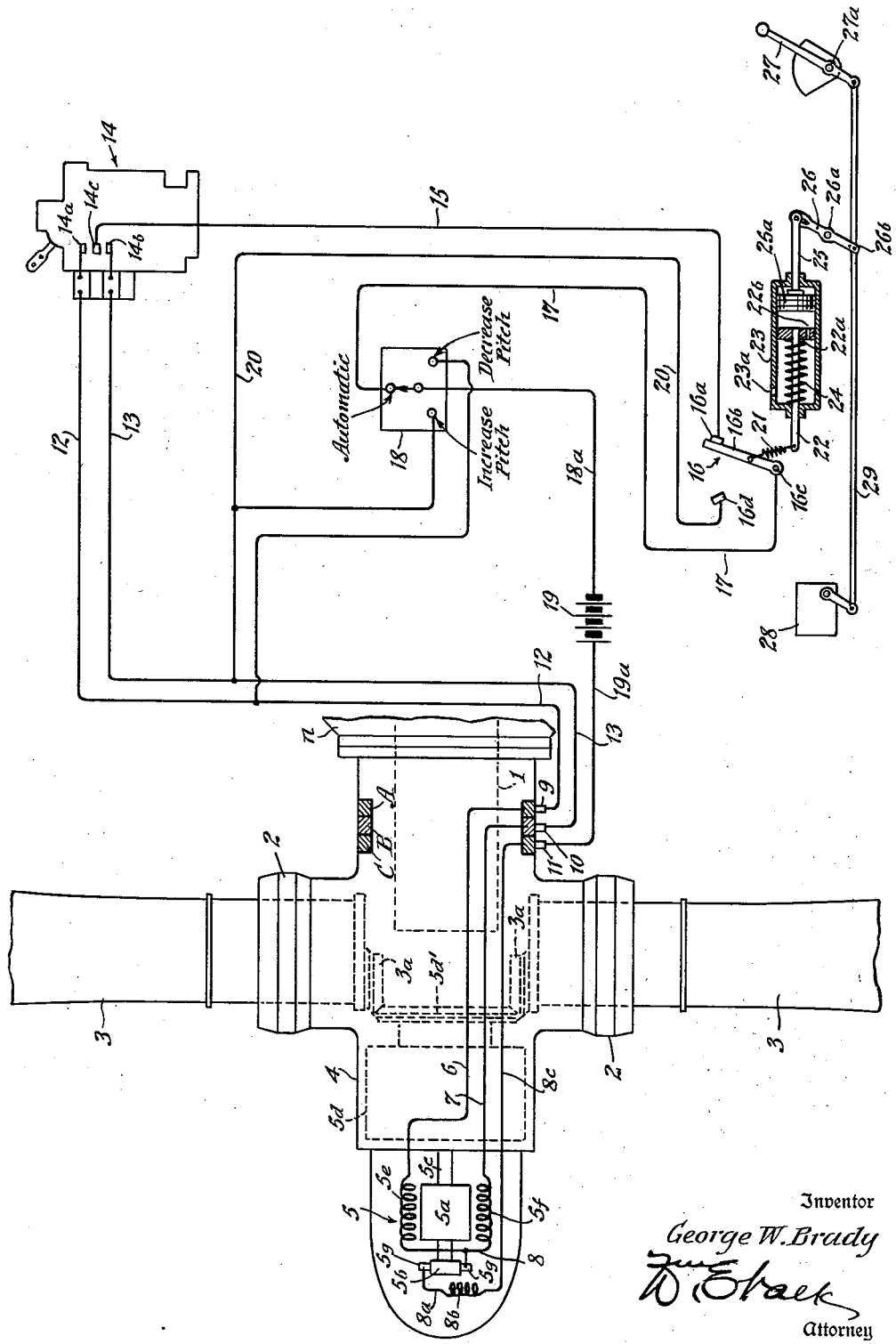
Inventor
George W. Brady
Attorney Patented Mar. 7, 1950

2,499,813

UNITED STATES PATENT OFFICE 2,499,813

CONTROL SYSTEM

George W. Brady, Upper Montclair, N. J., assignor to Curtiss-Wright Corporation, a corporation of Delaware Application July 7, 1944, Serial No. 543,926

3 Claims. (Cl. 170—135.74)

My invention relates to a control system. More particularly, my invention relates to the prevention of overspeeding or underspeeding in a prime mover such as an aircraft engine or an electric motor which has a speed-changing device associated therewith.

My invention is particularly applicable to a variable pitch propeller system, and is utilized to good effect in preventing harmful overspeeding of the aircraft engine which drives said propeller system. In such a system, it is quite common today to utilize an automatic governor to control the operation of an electric pitch-changing motor. Such a governor operates to maintain a substantially constant speed of rotation of the aircraft propeller. However, in cases where the throttle or other fuel controlling device of the aircraft is advanced rapidly, the engine also increases speed rapidly and there is a time lag before the governor can operate to cause a corrective increase in pitch of the propeller blades to thereby maintain the desired constant speed of rotation of the propeller. This occurs, in many cases, during the landing of the aircraft at which time the throttle is set at idling position. In the event that the pilot cannot complete the landing, it is necessary to advance the throttle rapidly to regain airspeed. In the prior art systems this may cause a temporary overspeeding of the aircraft engine which is quite serious, as a complete overhaul of the aircraft engine may then be required. I overcome this deficiency of the prior art systems by initiating corrective action of the propeller blades immediately upon a rapid advance of the throttle.

Various other advantages, objects and features of the invention will become apparent from consideration of the following detailed description together with the annexed drawing, in which the figure is a diagrammatic view illustrating my invention.

Referring now to the drawing, the nose $n$ of an aircraft engine is shown as having projecting therefrom a shaft 1 having splined thereto a propeller hub 2 in which the propeller blades 3 are journalled for changing the pitch thereof. Extending from the front of the hub 2 is a casing 4 which encloses a reversible electric motor schematically indicated at 5, for changing the pitch of the propeller blades 3. The armature 5a of the motor 5 has a commutator 5b and a shaft 5c which is connected by a double planetary speed-reducing system, indicated at 5d, to a ring gear 5d' which meshes with bevel gears 3a, 3a integrally formed on the roots of the propeller blades 3, 3 respectively. The hub is further provided with slip rings A, B and C for conducting electrical energy to the motor 5. The arrangement described herein is a diagrammatic representation of a well known form of electrically controlled pitch-changing mechanism. However, it will be understood that the invention is applicable to other types of pitch-changing systems.

Forming a part of the motor 5 are oppositely wound field coils 5e, 5f which are connected by conductors 6 and 7, respectively, to slip rings A and B. The field coils 5e, 5f have a common terminal which is connected by a conductor 8 to one of a set of brushes 5g, 5g which are coactable with the commutator 5b, the other brush 5g having a conductor 8a extending therefrom to a brake coil 8b which, in turn, is connected to slip ring C by a conductor 8c. Coactable with the slip rings A, B and C are brushes 9, 10 and 11, respectively. Extending from the brushes 9 and 10 are conductors 12 and 13, respectively, which are connected to switch contacts 14a, 14b of an automatic governor 14, as known in the art and which, for example, may be of the type disclosed in application Serial No. 261,879, filed March 15, 1939, now U. S. Patent No. 2,449,452. Disposed between the contacts 14a, 14b is a central movable contact 14c, the position of which is dependent upon the speed of rotation of the aircraft engine. A conductor 15 connects the contact 14c with a terminal 16a of a snap switch 16, the arm 16b of which is pivoted at 16c and has secured thereto a conductor 17 which passes to a terminal of a selector switch 18, the arm of which is connected by a conductor 18a to one terminal of a battery 19, the other terminal of which is connected to brush 11 by a conductor 19a.

As shown, the selector switch 18 is in "automatic" position and, since the arm of switch 16 is in its normal position in contact with terminal 16a, current is supplied to the movable contact 14c of the automatic governor 14. When contact 14c engages contact 14a, current is fed to the field coil 5e with resultant decrease in the pitch of the propeller blades. In similar fashion, when contact 14c engages contact 14b, current is fed to the field coil 5f with resultant increase in pitch of the propeller blades. The governor 14, then, has a normal mode of operation whereby it automatically controls the motor 5 to effect the pitch-changing operation. By this operation, there is maintained a substantially constant speed of operation of the airplane engine. In addition, manual control of the pitch-changing system may be effected by moving selector switch 18 to "increase pitch" or "decrease pitch" position to thereby feed current to field coil 5f or field coil 5e, respectively. Thus far, with the exception of the snap switch 16, I have described an electric propeller system well known in the prior art and extensively used in present day aircraft.

My invention resides in the utilization of the snap switch 16 together with its associated wiring and apparatus. As shown, when the arm of snap switch 16 is released from contact 16a and engages contact 16d, no current passes through the governor 14 and the operation thereof is entirely suspended or, alternatively, the normal mode of operation thereof may be modified to accomplish the purpose hereinafter described. At this time, current passes through contact 16d and a conductor 20 secured thereto to the "increase pitch" field coil 5f of the motor 5 with resultant pitch change of the propeller blades.

The mechanism for operating the snap switch 16 comprises a spring 21, one end of which is attached to the central portion of the arm 16b, the other end being secured to a rod 22 which has a piston 22a slidably supported within a tubular casing 23. The piston 22a is biased to the right by a compression spring 24. For a purpose described later, the piston 22a is provided with a small vent 22b while the casing 23 has a comparatively large vent 23a situated near the left hand end thereof. Journalled in the casing 23 is a rod 25 which, at one end thereof, is secured to a piston 25a slidable within the casing 23, the other end of said rod 25 being secured to a crank 26 pivoted at 26a and attached to the throttle control mechanism at 26b. As shown, the throttle control mechanism comprises an adjusting arm 27 pivoted at 27a and attached to a power controlling device 28 by a rod 29. The device 28 may be, for example, a carburetor which controls the fuel supply for the hereinbefore described aircraft engine. Many equivalent arrangements will be obvious to those skilled in the art, the important feature of the described throttle mechanism being that adjustment of the throttle control lever 27 results in corresponding longitudinal motion of the piston 25a.

The operation is as follows: If the throttle control lever is advanced rapidly, piston 25a is moved rapidly to the left with resultant compression of the air within the chamber P defined by the pistons 22a, 25a and the casing 23 to thereby cause leftward motion of piston 22a and rod 22. As soon as the left hand end of rod 22 moves to the left of the extended longitudinal axis of switch arm 16b, the contact at 16a is broken and the switch arm 16b moves to the left to engage contact 16d causing the governor control to become inoperative and causing current to flow through conductor 20 to field coil 5f with resultant increased pitch operation of the motor 5.

The described leftward motion of the rod 22 is opposed by the compression spring 24 which, when compressed exerts a force upon the piston 22a tending to cause rightward motion thereof. Accordingly, as the air pressure within the aforesaid chamber P decreases due to air escaping therefrom through the vent 22b, the piston 22a moves slowly to the right, the speed of this motion being controlled by the size of the vent 22b. As soon as the left hand end of the rod 22 passes to the right of the extended longitudinal axis of switch arm 16b, the contact at 16d is broken and the arm 16b again engages the contact 16a to cause the governor 14 to resume control of the pitch-changing motor 5 and to stop the described increased pitch operation of the motor 5. Thus, after each rapid advance of the throttle 27 there will be a period of increased pitch operation of the motor 5 during which the control action of governor 14 is suspended.

If the throttle is advanced slowly, the arm 25 will move slowly to the left and air will escape through the vent 22b rapidly enough to prevent sufficient air pressure from being built up within the chamber P to impart any substantial leftward motion to the rod 22 against the pressure of spring 24. In this case, switch arm 16b will remain in engagement with contact 16a and the control action of the governor 14 will not be interrupted.

An advantage of my invention lies in the fact that when the throttle is advanced rapidly, blade pitch increase is initiated at once to offset any tendency of the aircraft engine to overspeed. Although such pitch increase would eventually be corrected by the governor, there would be a time lag before the operation thereof during which the engine would increase speed unchecked by any corrective action of the pitch-changing mechanism.

It is apparent, however, that my invention should not be restricted to installations in which an electric governor is used. Broadly speaking, my invention relates to initiating corrective adjustments to the speed-changing mechanism of a prime mover when a relatively large change is made in some operating characteristic of said prime mover to thereby prevent overspeeding or underspeeding thereof.

With the form of the invention herein disclosed, the setting of the carburetor 28 is a condition affecting the power output of the aircraft engine. Change in this condition affects the power output of the aircraft engine and, if the change is substantial and abrupt, there is a response in accordance with the invention, which causes direct operation of the speed changer, namely, the pitch-changing mechanism. Obviously, the invention is not to be limited to an arrangement for actuating the speed changer in response to change in the particular condition referred to above.

While the invention has been described with respect to a certain particular preferred example which gives satisfactory results, it will be understood by those skilled in the art after understanding the invention, that various changes and modifications may be made without departing from the spirit and scope of the invention, and it is intended therefore in the appended claims to cover all such changes and modifications.

What is claimed as new and desired to be secured by Letters Patent, is:

1. In a variable pitch propeller system, an aircraft engine, a propeller hub driven thereby, propeller blades journaled in said hub, means for changing the pitch of said propeller blades, devices actuatable individually for operating said pitch-changing means, one of said devices being an automatic governor and the other of said devices being a member which is movably adjusted to change a condition affecting the power output of said engine, and means responsive to the rate of adjustment of said member for transferring the control of the pitch-changing operation from one device to the other, said last named means comprising a casing, a pair of pistons therein, one of said pistons being actuated by said member, and an air vent controlling the rate of movement of the other piston.

2. In a variable pitch propeller system an engine and a propeller driven thereby, the propeller having blades and the system including means for changing the pitch of the blades, a governor normally operable to increase and decrease blade pitch through said means to maintain constant propeller speed, a manually operable power control for said engine, means responsive to more than a certain rate of speed of adjustment of said control in a power increasing direction for operating said pitch changing means to increase propeller blade pitch and concurrently to disconnect governor control over said pitch changing means, said responsive means comprising a fluid dashpot including an input element connected to said control and an output element connected to said pitch changing means, said output element having a normal position establishing governor control of said pitch changing means, said dashpot including means controlling the movement of the output element from its normal position, dependent upon the rate of movement of the input element from any position within its normal range of movements, and said dashpot also including resilient means to restore and hold said output element in its normal position upon cessation of input member movement or movement of said input member at less than said certain rate of speed of adjustment.

3. In a variable pitch propeller system an engine and a propeller driven thereby, the propeller having blades and the system including means for changing the pitch of the blades, a governor normally operable to increase and decrease blade pitch through said means to maintain constant propeller speed, a manually operable power control having a linkage connecting it to the engine, a dashpot having an input element connected to and operated by said linkage, said dashpot having an output member, a switch operated by said output member to energize the pitch changing means for pitch increase and to disconnect the governor from said pitch changing means, said dashpot including a fluid bleed, and resilient means to restore and hold said output element in normal position within a certain time interval after movement thereof by said input member and thus to operate said switch to reconnect the governor to said pitch changing means.

GEORGE W. BRADY.

REFERENCES CITED

The following references are of record in the file of this patent:

UNITED STATES PATENTS

| Number | Name | Date |
|---|---|---|
| 1,374,787 | Walker | Apr. 12, 1921 |
| 1,705,688 | Staege | Mar. 19, 1929 |
| 1,843,960 | Sticelber | Feb. 9, 1932 |
| 1,869,134 | Dietze | July 26, 1932 |
| 1,921,710 | Stohr | Aug. 8, 1933 |
| 2,001,590 | Spiller | May 14, 1935 |
| 2,011,651 | Puffer | Aug. 20, 1935 |
| 2,146,070 | Holt | Feb. 7, 1939 |
| 2,195,036 | Palmer | Mar. 26, 1940 |
| 2,195,766 | Courcoulas | Apr. 2, 1940 |
| 2,346,007 | Chillson | Apr. 4, 1944 |
| 2,346,916 | Halford et al. | Apr. 18, 1944 |
| 2,358,894 | Volet | Sept. 26, 1944 |
| 2,391,323 | Martin | Dec. 18, 1945 |

OTHER REFERENCES

Ser. No. 211,843, Stieglitz (A. P. C.), published May 18, 1943.

Ser. No. 363,192, Lorenzen (A. P. C.), published May 18, 1943.